(No Model.) 2 Sheets—Sheet 1.
W. A. VAN BENTHUYSEN.
TREE FELLING SAW.
No. 385,488. Patented July 3, 1888.
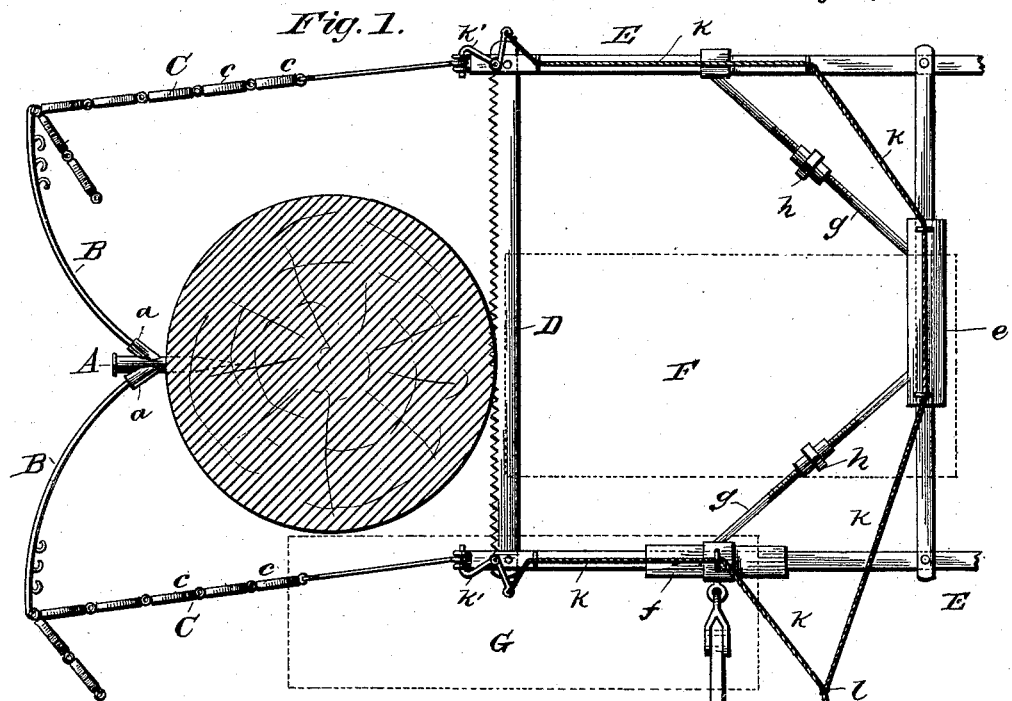
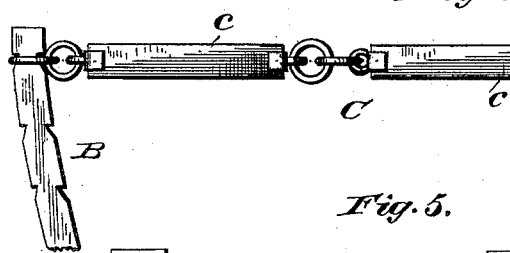
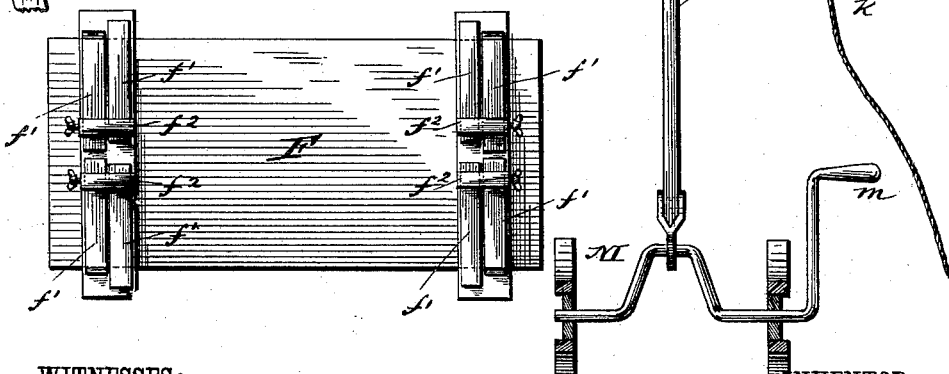
WITNESSES:
Phil C. Dieterich.
Edgar Tate.
INVENTOR:
W. A. Van Benthuysen.
BY Munn & Co.
ATTORNEYS.

(No Model.) 2 Sheets—Sheet 2.
W. A. VAN BENTHUYSEN.
TREE FELLING SAW.
No. 385,488. Patented July 3, 1888.
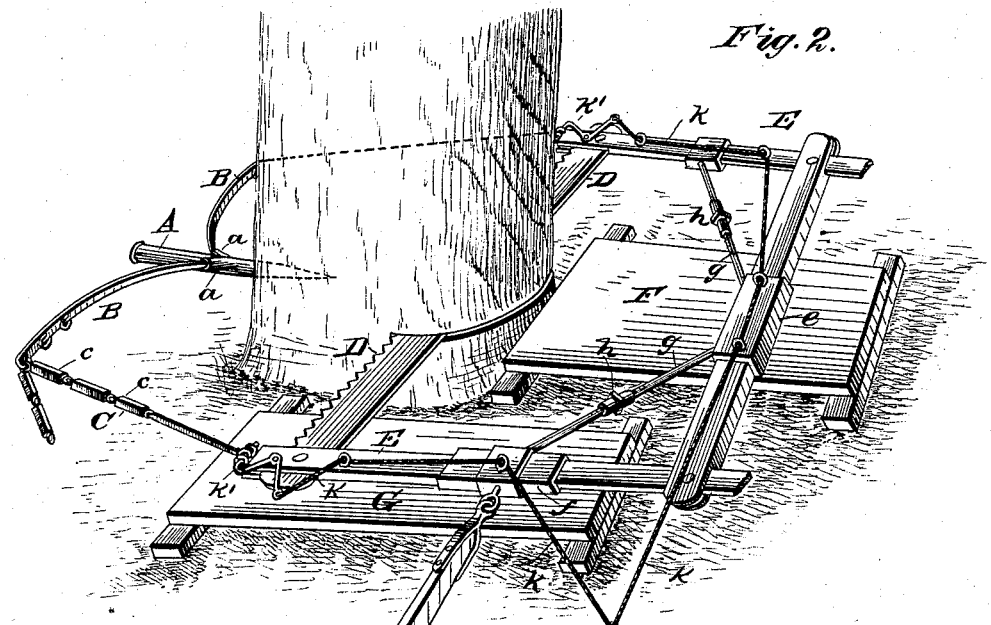
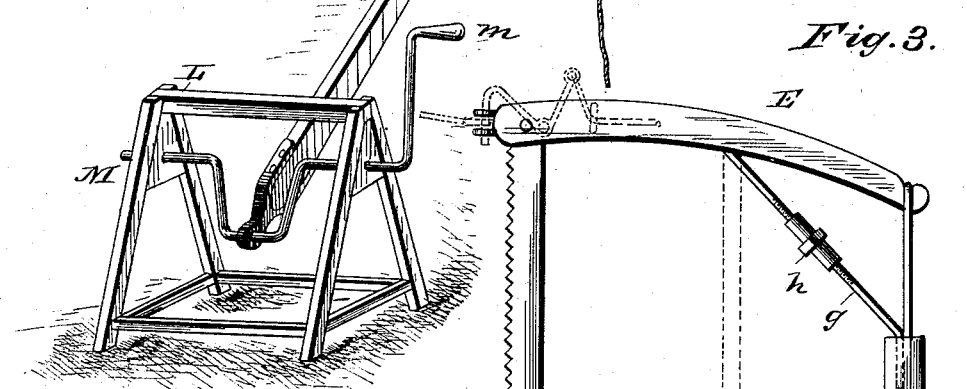
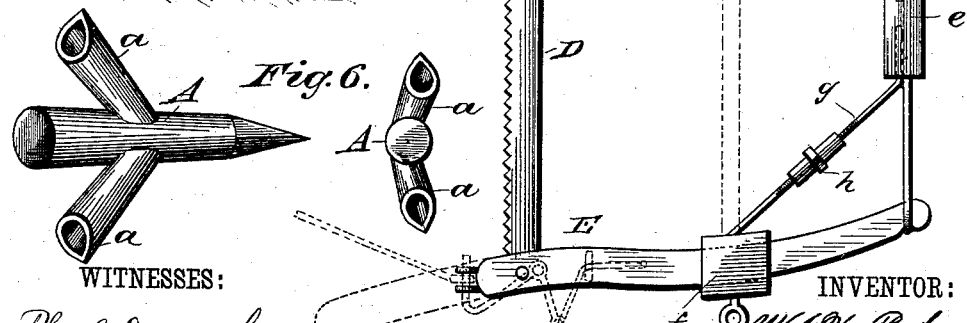
WITNESSES:
Phil C. Dietrich.
Edgar Tate.
INVENTOR:
W. A. Van Benthuysen
BY Munn & Co.
ATTORNEYS.

United States Patent Office.

WILLIAM A. VAN BENTHUYSEN, OF NEW YORK, N. Y.

TREE-FELLING SAW.

SPECIFICATION forming part of Letters Patent No. 385,488, dated July 3, 1888.

Application filed August 1, 1887. Serial No. 245,884. (No model.)

*To all whom it may concern:*

Be it known that I, WILLIAM A. VAN BENTHUYSEN, of the city, county, and State of New York, have invented a new and Improved Tree-Felling Saw, of which the following is a full, clear, and exact description.

The invention consists of a saw supported in horizontal position for felling trees by sawing across them near the ground, the saw being partially supported, held in working position, and kept up to its work by springs, said springs forming a portion or the whole of the length of cords or chains attached to the ends of the saw or the said frame, said cords or chains being attached at or near their other ends to a bar, or to arms extending from a bar, driven into and projecting from the opposite side of the tree from that on which the saw commences its work.

In the accompanying drawings, Figure 1 shows a plan view of the saw in working position with operating pitman and crank. Fig. 2 is a perspective view of the tree-felling saw and its connections. Fig. 3 is a partial plan view of a bucksaw adapted for use in connection with my invention. Fig. 4 is another view of the spring-chain and its method of attachment to the spring arms. Fig. 5 is an inverted plan view of one of the beds or tables on which ride the back of saw-frame and pitman connections, and Fig. 6 gives two perspective views of rod or bar driven into the tree.

In the plan view, Fig. 1, the bar A, which may be but little larger than an ordinary railroad-spike, has opposite pockets $a$ $a$ a little above its longitudinal center to form sockets for the spring-arms B B, these sockets being large enough in their central opening to freely admit the ends of the spring-arms and enlarged or extended longitudinally along their outer sides outerly, as better shown in Fig. 6, so that the spring-arms when under strain from the saw will fit into outwardly-extending grooves of the socket, and thereby be held in relatively true horizontal position, but so that their outer ends will be slightly higher than their inner ends. The spring-arms may be of hickory or other suitable wood, themselves forming springs, with rings, as shown in Fig. 1, or small cuts, as shown in Fig. 4, for ready attachment of the spring cords or chains, or they may be of metal.

The spring chains or cords C C, attached at one end to the arms B B and at the other to the ends of the saw-frame E, are made up through most of their length of short spring-sections $c$ $c$, with intervening eyes or rings, as better shown in Fig. 4, for attachment, as desired, to the spring-arms B B, whereby their tension may be increased or diminished, the springs being preferably of rubber and of a quality to exert an almost uniform pull under the slightly-different lengths of stretch to which they will be subjected by the forward-and-backward motion of the saw.

The saw-frame E is made mainly of ash or a similar light but firm wood, with a strong back piece, $e$, and one end piece, $f$, preferably of metal, with bracing bars $g$ $g$, having their central portions oppositely threaded and carrying thumb-nuts $h$ $h$, by which the saw-holding ends of the saw-frame can be held stiffly apart. In eyes on the side pieces, and extending from the farther side across the back piece, are light cords $k$, which unite in one cord at $l$, thence passing to the convenient reach of the sawyer, these cords being attached at their other ends to a latch, $k'$, or spring-catch, or other similar connection, by which the spring cords or chains can, with a slight pull, be simultaneously released from their hold on the saw.

F and G represent in dotted lines in the plan view low beds or tables, on which ride the back piece, $e$, and the end piece, $f$, of the saw-frame. These beds or tables may be of wood, metal-faced, or other suitable material, and are preferably provided with folding and extensible legs, so as to be conveniently adjustable to the height at which the saw is to operate, or so they will readily form a bed upon snow. An inverted plan view of a simple form of such bed or table is shown in Fig. 5, in which $f'$ represents a short hinged leg and an adjustable extension thereof, and $f^2$ a sleeve with thumb-screw for securing and regulating length of extension, any longer extension of similar cross-section being readily fixed in the sleeve by the thumb-screw.

H represents a pitman through which the power is applied to operate the saw, the pitman being of wood, with metal end pieces, and attached at its outer end to a U-shaped section of a short shaft operated by a crank, $m$, and journaled in a horse, M, a little higher but not necessarily heavier than an ordinary saw-buck, the pitman connections at both ends being such as to give a little latitude of motion, whereby a slight lateral movement of the horse, as the sawyer can lift it up and move it along, will keep the pitman sufficiently in alignment with the motion of the saw to effect a comparatively straight cut.

In the adaptation of a bucksaw for tree-felling, as shown in Fig. 3, the ordinary center bar is omitted and the saw is held stiffly in the frame by braces, as shown in Fig. 1, the center of the back piece and the end to which the pitman is connected being provided with fixed metal or other sleeves or permanent additions to the weight of the saw-frame at these places of nearly rectangular shape; or these sleeves may also be made integral with the back and ends of the saw-frame, but with flat bottom faces adapted to slide readily on the beds or tables E F, and by their additional weight assist to steady the motion of the saw, the back piece opposite the main line of contact of the working-face of the saw being considerably the heaviest and the weight of this piece being proportionately heavier for the sawing of harder wood and thicker trees.

The metal back piece, e, of the saw-frame will always be of sufficient weight, dependent upon the size of the saw, the strength of the springs, and the character of the work, to hold the saw to a comparatively straight cut when the power is applied at f, and this weight of the back piece would normally be about equal to that of all the rest of the saw-frame. In sawing, when the slides for the pitman-connection and back piece might be partially coated with snow or ice, the two pieces e and f might be of wood and of larger size.

The horse or light frame M, on which the U-shaped operating-shaft is journaled, may be made to be folded for convenient carriage, and all the parts are detachable and intended to be so light that it will not be much more burdensome for a sawyer to take the equipment into the woods than it would be to carry thither a saw and a buck, while all parts liable to breakage are cheap and easily replaced.

The frame supporting the operating-shaft is of convenient height for the sawyer to rest his weight through his left hand well on its top, his left foot being placed on a rung near the bottom, while with his right hand he turns the crank m. The U-shaped portion of the shaft to which the pitman is attached will have a sweep through a circle about fifteen inches diameter, or such as to give the desired stroke of the saw, the sweep of the operating crank-handle being normally greater; but these points are variable, according to the capacity of the workman and the kind of work to be done, except that the length of the saw must always equal the diameter of the tree to be cut plus the full length of its stroke. When the tree is about to fall, the sawyer, through the strings k and l and the latch k', detaches the springs C from their attachment to the saw-frame, when their arms B will spring back and fall out of their sockets a a. The sawyer can then reach forward, and, by taking hold of the pitman, pull the saw back, so that it may not be struck by the falling timber.

This specification describes the preferred construction and arrangement of elements constituting my invention. It should be understood, however, that it is intended to embrace all modifications and changes within the scope of the claims hereto appended.

Having thus fully described my invention, I claim as new and desire to secure by Letters Patent—

1. A sawing device, made substantially as described, consisting of the following elements operated in combination, namely: a reciprocating saw, a tree-spike, yielding arms extending from the spike, and flexible connections between the yielding arms and the extremities of the saw, as set forth.

2. In a tree-sawing device, the rod or spike A, constructed with a central point and socketed side arms at each side, as shown and described.

3. In a tree-sawing device, the rod or spike A, constructed with a central spike or point and tubular arms on opposite sides, said tubes having open outer ends forming sockets for the spring-arms hereinbefore referred to, and the sockets being enlarged or extended longitudinally along their outer sides, as shown and described, and for the purpose set forth.

4. The combination, with a saw and its frame, a pitman, and operating-crank, of a bar or spike formed with sockets a a, adapted to receive spring-arms, said arms, and connections between the arms and the saw, substantially as described.

5. The combination, with a saw and its frame and a means for reciprocating the saw, of a bar or spike, spring-arms carried thereby, spring-releasing catches arranged at each end of the saw, connections between the catches and the spring-arms, and an operating-cord arranged in connection with the catches, substantially as described.

6. The combination, with a bar or spike having sockets a a, adapted to receive spring-arms, said arms, and connections between the arms and the saw, and means for reciprocating the saw, of a bucksaw with its central bar removed, the saw-holding ends of its frame held apart by screw-threaded bracing-rods from the back of the frame and the central portion of the back of the frame, and a portion of one end of the frame carrying fixed metal or other sleeves of nearly rectangular shape, but having flat bottom sliding faces, in the manner and for the purpose described.

WILLIAM A. VAN BENTHUYSEN.

Witnesses:
 EDGAR TATE,
 EDWD. M. CLARK.